(12) United States Patent
Weeks

(10) Patent No.: US 6,679,407 B2
(45) Date of Patent: Jan. 20, 2004

(54) MOVEABLE STOWAGE ASSEMBLY

(75) Inventor: Ian Weeks, Southampton (GB)

(73) Assignee: AS Fire & Rescue Equipment Ltd (GB)

( * ) Notice: Subject to any disclaimer, the term of this patent is extended or adjusted under 35 U.S.C. 154(b) by 58 days.

(21) Appl. No.: 09/930,742

(22) Filed: Aug. 15, 2001

(65) Prior Publication Data

US 2002/0070254 A1 Jun. 13, 2002

(30) Foreign Application Priority Data

Aug. 15, 2000 (GB) .............................................. 0019897

(51) Int. Cl.$^7$ ................................................ B60R 9/042
(52) U.S. Cl. ........................ 224/310; 224/553; 414/462
(58) Field of Search .............................. 224/310, 319, 224/321, 553; 414/462

(56) References Cited

U.S. PATENT DOCUMENTS

| | | | | | |
|---|---|---|---|---|---|
| 2,318,971 A | * | 5/1943 | Roumage et al. | ............ | 414/462 |
| 3,480,166 A | * | 11/1969 | Abbott | ................. | 414/462 |
| 4,234,285 A | * | 11/1980 | Martinez | ................... | 414/462 |
| 4,240,571 A | * | 12/1980 | Ernst | .......................... | 224/310 |
| 4,682,719 A | * | 7/1987 | Ernst et al. | .................. | 224/310 |
| 5,505,579 A | * | 4/1996 | Ray et al. | .................... | 414/462 |
| 5,782,391 A | * | 7/1998 | Cretcher | ..................... | 224/310 |
| 5,827,036 A | * | 10/1998 | Steffes et al. | ............... | 414/462 |
| 6,158,638 A | * | 12/2000 | Szigeti | ........................ | 224/310 |
| 6,428,263 B1 | * | 8/2002 | Schellens | .................... | 414/462 |

* cited by examiner

Primary Examiner—Stephen K. Cronin
(74) Attorney, Agent, or Firm—Dority & Mannig, P.A.

(57) ABSTRACT

A moveable stowage for a ladder or other equipment on top of a vehicle comprises a stowage frame and an outer frame secured pivotally at its forward end. The moveable stowage may be releasably secured in the stowed position or held in an access position. The stowage frame is adapted to slide on at least one pivot assembly from a substantially horizontal stowed position to an access position, and the forward end of the stowage frame is pivotally connected to the outer frame in order to slide along the outer frame thus enabling the stowage frame to reach an access position approaching the vertical. Other embodiments are described, which assist in counter balancing the stowage frame.

13 Claims, 1 Drawing Sheet

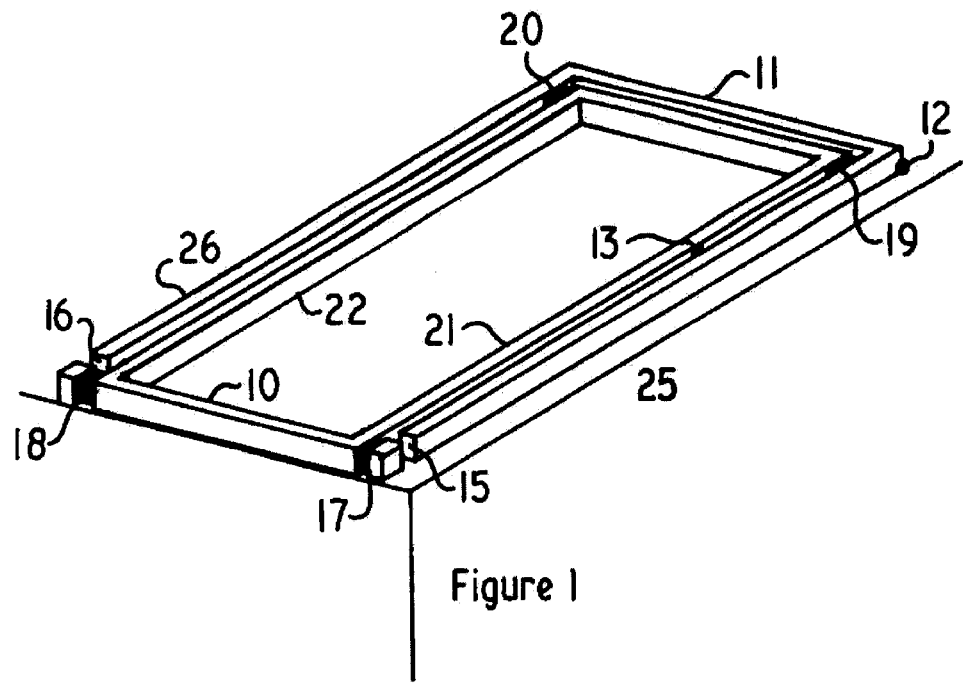
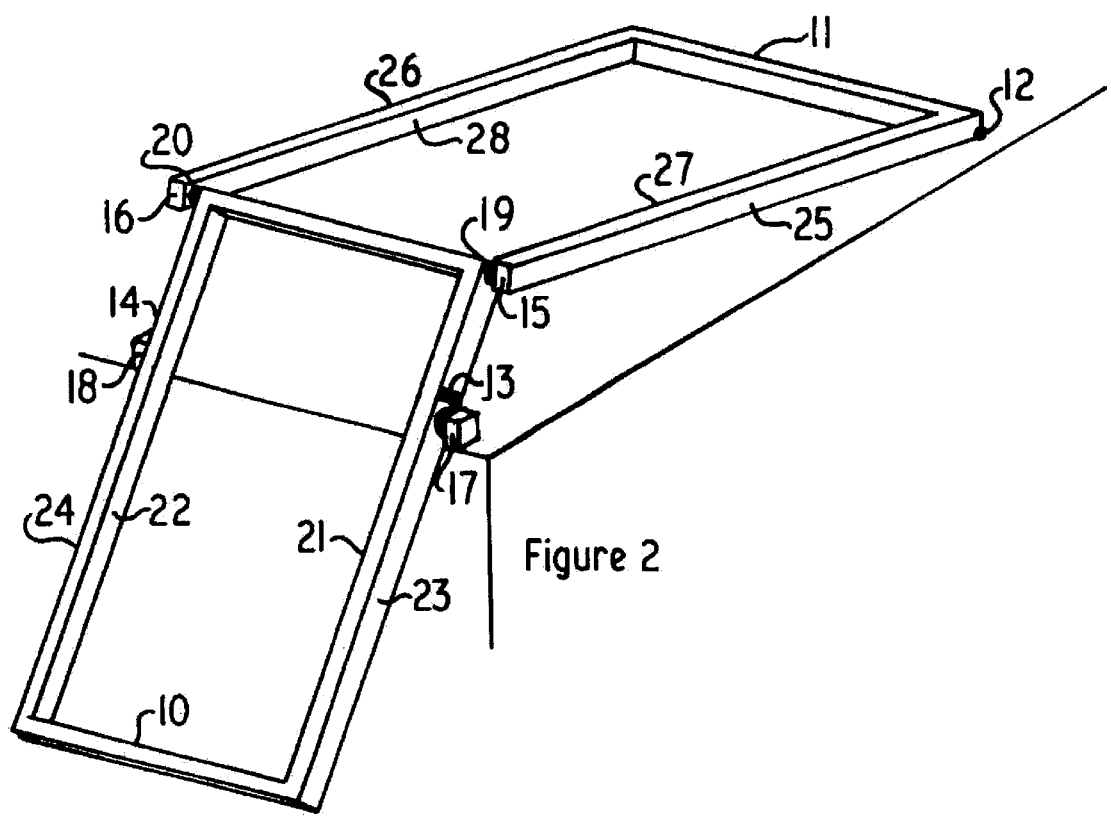

MOVEABLE STOWAGE ASSEMBLY

FIELD OF THE INVENTION

This invention relates to the stowage of ladders and other equipment on the top of vehicles. In particular, the invention is directed to loading and unloading ladders or other items from the top of a vehicle by an operator standing at ground level.

BACKGROUND OF THE INVENTION

Vehicles such as those used by Fire Departments and Utility companies, for example, carry ladders and other equipment on their tops. Due to the height of these top-side stowages, and taking into account health and safety requirements, access to equipment from the ground level has become a necessity, if not a requirement. Some existing systems designed to meet this requirement utilize the center of gravity and are thereby limited in the amount of access available, especially on shorter stowages. Other current examples have high overall working heights and may be expensive to manufacture, install, and maintain.

SUMMARY OF THE INVENTION

This invention provides greater and easier access to equipment carried on top of vehicles with a lower working height. Additionally, the component parts are simple, reliable and economical to manufacture, assemble and use.

According to this invention there is provided a moveable stowage on top of a vehicle having a stowage frame and an outer frame secured pivotally at its forward end. The stowage frame can be releasably secured in the stowed position and held in an access position. The stowage frame is adapted to slide on at least one pivot assembly from a substantially horizontal stowed position to an access position. Optimally, the forward end of the stowage frame is pivotally connected to the outer frame so as to be able to slide along the outer frame thus enabling the stowage frame to reach an access position approaching the vertical.

BRIEF DESCRIPTION OF THE DRAWINGS

The above and other aspects of the present invention are apparent from the detailed description below with reference to the accompanying drawings of which.

DETAILED DESCRIPTION OF THE INVENTION

Figure 1:
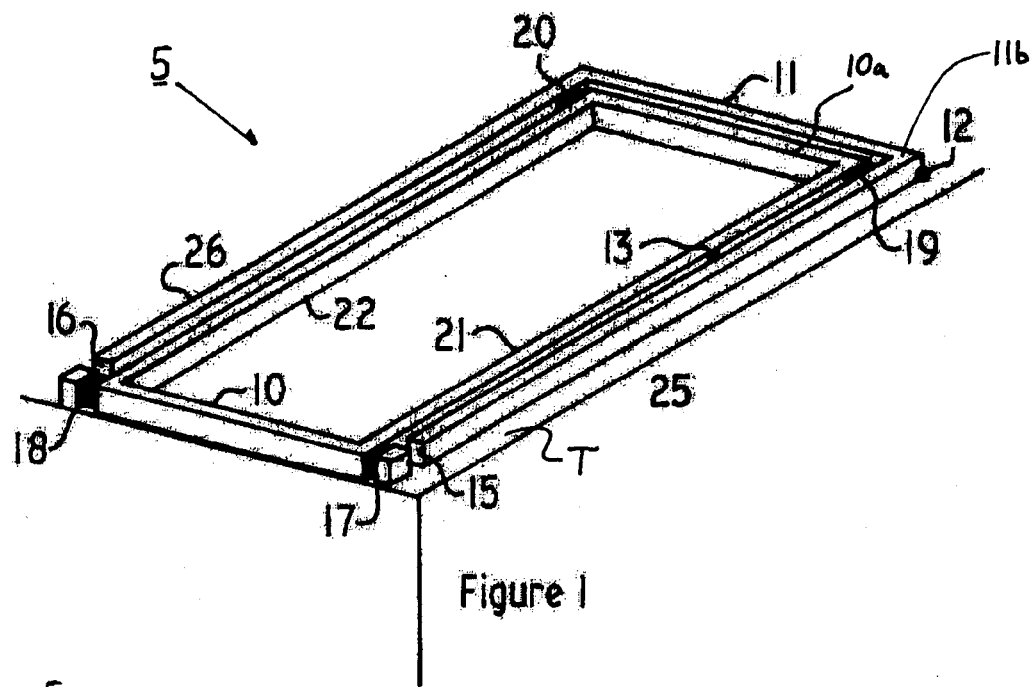
FIG. 1 is a top perspective view showing the stowage frame in the stowed position. on the top of a truck, for example.

Detailed reference will now be made to the drawings in which examples embodying the present invention are shown. The detailed description uses numerical and letter designations to refer to features in the drawings. Like or similar designations in the drawings and description have been used to refer to like or similar parts of the invention.

The drawings and detailed description provide a full and detailed written description of the invention, and of the manner and process of making and using it, so as to enable one skilled in the pertinent art to make and use it, as well as the best mode of carrying out the invention. However, the examples set forth in the drawings and description are provided by way of explanation of the invention and are not meant as limitations of the invention. The present invention thus includes any modifications and variations of the following examples as come within the scope of the appended claims and their equivalents.

Figure 2:
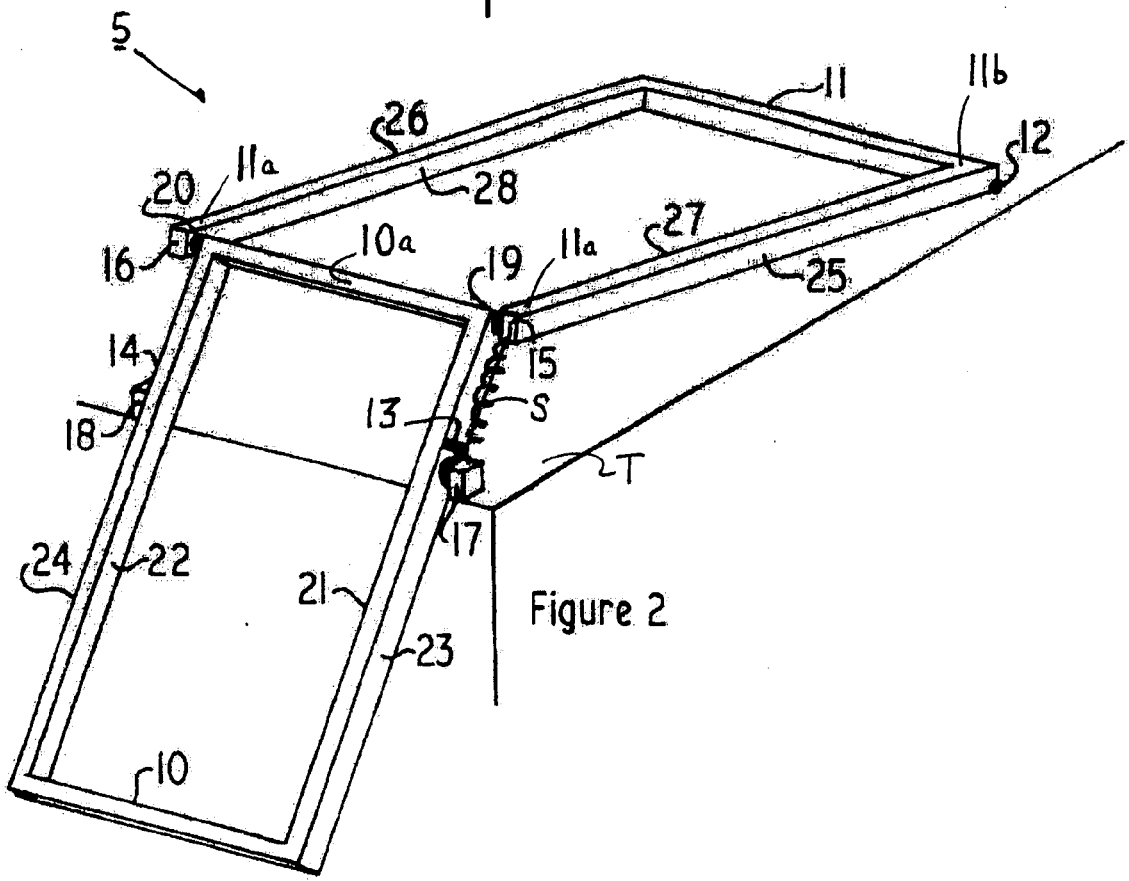
FIG. 2 is a view similar to FIG. 1 illustrating the stowage frame in the access position.

A vehicle such as a fire engine may have on its top T a moveable stowage for a ladder as broadly embodied in the Figures. In one aspect of the invention, a moveable stowage assembly 5 has a stowage frame 10 and an outer frame or holder 11 secured pivotally by securement element 12 at its forward end. The stowage (storage) frame 10 may be releasably secured in the stowed position (FIG. 1) and held in the outer frame 11 in an access position (FIG. 2) by stop components 13, 14, 15 and 16. The stowage frame 10 is adapted to slide on each pivot assembly 17, 18 from the stowed position of FIG. 1 to an access position as shown in FIG. 2. The forward end 10a of the stowage frame 10 may be pivotally connected by pivot elements 19, 20 to the outer frame 11 so as to be able to slide along the outer frame 11.

The stowage frame 10 is optionally a substantially flat rectangular structure in which the longitudinal side members 21, 22 incorporate guides or rails 23, 24 by which the pivot assembly 17, 18 is connected to the stowage frame 10. This example construction allows the movement of the pivot assembly 17, 18 along the guides 23, 24 while also allowing the stowage frame 10 angular movement relative to the pivot assembly 17, 18 about an axis substantially normal to the longitudinal side members 21, 22 of stowage frame 10 in the horizontal plane.

Optionally affixed to the guides 23, 24 are stops 13, 14, which restrict the movement of each pivot assembly 17, 18 along the guides 23, 24. Also the outer frame 11 may have longitudinal members 25, 26 running parallel to and for substantially the length of the stowage frame 10. In this aspect, the outer frame longitudinal members 25, 26 incorporate complementary guides 27, 28 running the length of the outer frame longitudinal members 25, 26 such that the forward end 10a of the stowage frame 10 is pivotally connected by connections 19, 20 to the complementary guides 27, 28 so as to allow the movement of the stowage frame 10 along the complementary guides 27, 28 while also allowing the stowage frame 10 angular movement relative to the outer frame 11 about an axis substantially normal to the storage frame 10 in the horizontal plane.

At the rear end 11a of the outer frame 11, complementary guides 27, 28 may be provided complementary stops 15, 16 to restrict the movement within the complementary guides 27, 28 of the pivotal connection 19, 20 at the forward end 10a of the storage frame 10. In this aspect, the outer frame 11 may be pivotally secured by securement element 12 at the forward end 11b so as to allow angular movement about the axis in the horizontal plane substantially normal to the storage frame 10. This example configuration is such that when in the stowed condition of FIG. 1, the storage frame 10 is substantially horizontal and the rear end of the storage frame 10 is supported by each pivot assembly 17, 18. Also in this arrangement, the front end 10a of the storage frame 10 is supported by its attachment 19, 20 to the outer frame 11.

To illustrate an operation of the invention, upon release of the stowage frame 10 from the stowed position (FIG. 1) and the subsequent application of a directional force to the stowage frame 10, the guides 23, 24 on the stowage frame 10 slide across each pivot assembly 17, 18, and at the same time the connection 19, 20 of the stowage frame 10 slide along the complementary guides 27, 28 in the outer frame 11. When the center of gravity of the stowage frame 10 passes over each pivot assembly 17, 18, the stowage frame 10 pivots about each pivot assembly 17, 18 causing the rear 11a of the outer frame 11 to rise and the outer frame 11 to pivot about its frontal pivotal securement 12 thus allowing the stowage frame 10 to pivot about each pivot assembly 17, 18 until an access position approaching the vertical is reached as shown in FIG. 2. The transition from the access position as shown in FIG. 2 to the stowed position shown in FIG. 1 is the reverse of the above.

In another embodiment substantially as previously described, a spring element S can be attached to the rear end 11a of the outer frame 11 adjacent to the complementary stops 15, 16. The spring element S may aid the force of gravity and thus delay and slow the change of plane of the stowage frame 10 from the substantially horizontal stowed plane (FIG. 1) to the approaching vertical access position (FIG. 2). This allows a larger portion of the stowage frame 10 to be below the pivot assembly 17, 18 thus affording better access when the stowage frame 10 is in the approaching vertical access position. During the transition of the stowage frame 10 from the access position to the stowed position, the spring element S may also assist in raising the stowage frame 10 to the horizontal.

It will be apparent to those skilled in the art that various modifications and variations can be made in the present invention without departing from the scope and spirit of the invention. For example, specific shapes of various elements of the illustrated embodiments may be altered to suit particular vehicle or trailer applications. It is intended that the present invention include such modifications and variations as come within the scope of the appended claims and their equivalents.

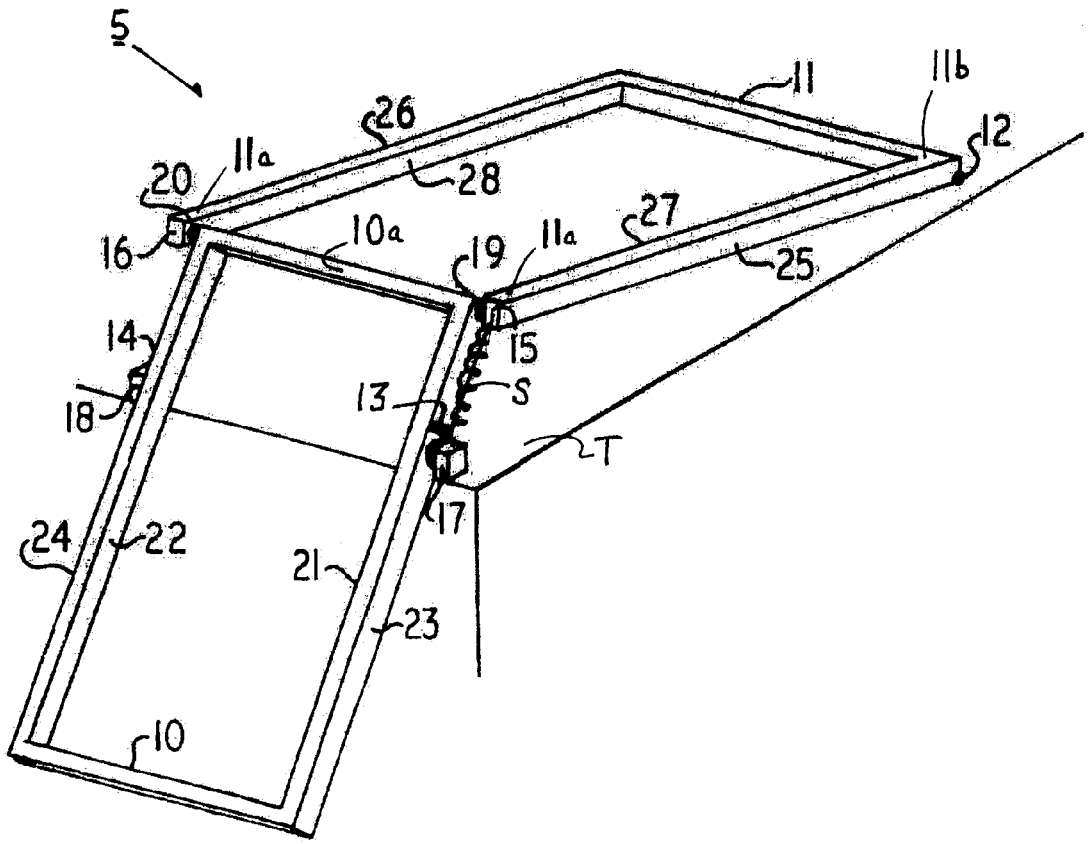

What is claimed is:

1. A moveable stowage assembly for a vehicle, comprising:
    a stowage frame configured for a sliding movement;
    an outer frame disposed about the stowage frame and secured pivotally to the vehicle, the outer frame configured to permit the sliding movement of the stowage frame;
    means for releasably securing the stowage frame in a substantially horizontal stowed position; and
    stop means for holding the stowage frame in an access position, the stowage frame being adapted to slide on at least one pivot assembly from the stowed position to the access position, the stowage frame also being pivotally connected to the outer frame by a pivot element such that the stowage frame is slidable along the outer frame to reach the access position, the stowage frame disposed substantially vertically to the outer frame in the access position.

2. The moveable stowage assembly as in claim 1, wherein the stowage frame defines guide means co-operable with the at least one pivot assembly for controlling the sliding movement of the stowage frame on the at least one pivot assembly.

3. The moveable stowage assembly as in claim 1, wherein the outer frame defines complementary guide means co-operable with the stowage frame for controlling the sliding movement of the stowage frame on the outer frame.

4. The moveable stowage assembly as in claim 1, wherein the stop means is disposed on the stowage frame and is cooperable with the at least one pivot assembly to arrest the sliding movement.

5. The moveable stowage assembly as in claim 1, further comprising complementary stop means for arresting the sliding movement of the stowage frame, the complementary stop means disposed on the outer frame and cooperable with the pivot element to arrest the sliding movement.

6. The moveable stowage assembly as in claim 1, further comprising a spring element configured for counter balancing the stowage frame.

7. A moveable storage assembly for a vehicle, comprising:
    a holder pivotally affixed to the vehicle;
    a pivot assembly disposed proximate to the holder; and
    a storage element having a pivotal attachment slidably attached to the holder, the holder, the pivot assembly, and the pivotal attachment cooperable to extend the storage element from a substantially horizontal storage position in a direction away from the vehicle to a substantially vertical operative position proximate the vehicle.

8. The movable storage assembly as in claim 7, wherein the storage element defines at least one first rail and the holder defines at least one second rail, the at least one first rail configured to slide along the pivot assembly, the pivotal attachment configured to slide along the at least one second rail.

9. The movable storage assembly as in claim 8, further comprising at least one stop element disposed on the at least one first rail and at least another stop element disposed on the at least one second rail, the at least one stop element and the at least another stop element configured to stop a movement of the storage element.

10. A moveable storage assembly for a vehicle, comprising:
    a holder pivotally affixed to the vehicle;
    a pivot assembly disposed proximate to the holder; and
    a storage element having a pivotal attachment slidably attached to the holder, the holder, the pivot assembly, and the pivotal attachment cooperable to extend the storage element from a substantially horizontal storage position in a direction away from the vehicle to a substantially vertical operative position proximate the vehicle, the storage element having a spring to urge the storage element in a direction of the storage position.

11. The moveable stowage assembly as in claim 10, wherein the spring is configured for counter balancing the stowage frame.

12. The movable storage assembly as in claim 10, wherein the storage element defines at least one first rail and the holder defines at least one second rail, the at least one first rail configured to slide along the pivot assembly, the pivotal attachment configured to slide along the at least one second rail.

13. The movable storage assembly as in claim 12, further comprising at least one stop element disposed on the at least one first rail and at least another stop element disposed on the at least one second rail, the at least one stop element and the at least another stop element configured to stop a movement of the storage element.

* * * * *

UNITED STATES PATENT AND TRADEMARK OFFICE
CERTIFICATE OF CORRECTION

PATENT NO. : 6,679,407 B2
DATED : January 20, 2004
INVENTOR(S) : Weeks

It is certified that error appears in the above-identified patent and that said Letters Patent is hereby corrected as shown below:

The title page showing illustrative figure, should be deleted and substitute therefore the attached title page.

Delete Drawing Sheet 1 and substitute therefore the Drawing Sheets, consisting of FIG 1-2 as shown on the attached page.

Signed and Sealed this

Twenty-fifth Day of October, 2005

JON W. DUDAS
*Director of the United States Patent and Trademark Office*

United States Patent
Weeks

(10) Patent No.: US 6,679,407 B2
(45) Date of Patent: Jan. 20, 2004

(54) MOVEABLE STOWAGE ASSEMBLY

(75) Inventor: Ian Weeks, Southampton (GB)

(73) Assignee: AS Fire & Rescue Equipment Ltd (GB)

( * ) Notice: Subject to any disclaimer, the term of this patent is extended or adjusted under 35 U.S.C. 154(b) by 58 days.

(21) Appl. No.: 09/930,742

(22) Filed: Aug. 15, 2001

(65) Prior Publication Data

US 2002/0070254 A1 Jun. 13, 2002

(30) Foreign Application Priority Data

Aug. 15, 2000 (GB) .............................................. 0019897

(51) Int. Cl.$^7$ .............................................. B60R 9/042
(52) U.S. Cl. ........................ 224/310; 224/553; 414/462
(58) Field of Search ................................ 224/310, 319, 224/321, 553; 414/462

(56) References Cited

U.S. PATENT DOCUMENTS

| | | | | |
|---|---|---|---|---|
| 2,318,971 A | * | 5/1943 | Roumage et al. | 414/462 |
| 3,480,166 A | * | 11/1969 | Abbott | 414/462 |
| 4,234,285 A | * | 11/1980 | Martinez | 414/462 |
| 4,240,571 A | * | 12/1980 | Ernst | 224/310 |
| 4,682,719 A | * | 7/1987 | Ernst et al. | 224/310 |
| 5,505,579 A | * | 4/1996 | Ray et al. | 414/462 |
| 5,782,391 A | * | 7/1998 | Cretcher | 224/310 |
| 5,827,036 A | * | 10/1998 | Steffes et al. | 414/462 |
| 6,158,638 A | * | 12/2000 | Szigeti | 224/310 |
| 6,428,263 B1 | * | 8/2002 | Schellens | 414/462 |

* cited by examiner

*Primary Examiner*—Stephen K. Cronin
(74) *Attorney, Agent, or Firm*—Dority & Mannig, P.A.

(57) ABSTRACT

A moveable stowage for a ladder or other equipment on top of a vehicle comprises a stowage frame and an outer frame secured pivotally at its forward end. The moveable stowage may be releasably secured in the stowed position or held in an access position. The stowage frame is adapted to slide on at least one pivot assembly from a substantially horizontal stowed position to an access position, and the forward end of the stowage frame is pivotally connected to the outer frame in order to slide along the outer frame thus enabling the stowage frame to reach an access position approaching the vertical. Other embodiments are described, which assist in counter balancing the stowage frame.

13 Claims, 1 Drawing Sheet